US009148429B2

(12) United States Patent
Cairns et al.

(10) Patent No.: US 9,148,429 B2
(45) Date of Patent: Sep. 29, 2015

(54) CONTROLLING ACCESS BY WEB APPLICATIONS TO RESOURCES ON SERVERS

(75) Inventors: Brian Lewis Cairns, Boulder, CO (US); Eric Benson Schoeffler, Boulder, CO (US); John Day Richter, Denver, CO (US); Michael Jeffrey Procopio, Boulder, CO (US); Brian Edgar Eaton, Mountain View, CA (US); Adam Wayne Besen, Lyons, CO (US); Robert Eugene Wyrick, Firestone, CO (US)

(73) Assignee: Google Inc., Mountain View, CA (US)

(*) Notice: Subject to any disclaimer, the term of this patent is extended or adjusted under 35 U.S.C. 154(b) by 76 days.

(21) Appl. No.: 13/453,191

(22) Filed: Apr. 23, 2012

(65) Prior Publication Data

US 2015/0200948 A1    Jul. 16, 2015

(51) Int. Cl.
*H04L 29/06* (2006.01)
*G06F 21/44* (2013.01)
*H04L 9/32* (2006.01)
*G06F 21/62* (2013.01)

(52) U.S. Cl.
CPC .............. *H04L 63/10* (2013.01); *G06F 21/44* (2013.01); *G06F 21/6218* (2013.01); *H04L 9/3213* (2013.01); *H04L 63/101* (2013.01); *G06F 2221/2141* (2013.01)

(58) Field of Classification Search
CPC ................. G06F 21/6218; G06F 2221/2141; H04L 63/10; H04L 9/3213
USPC ............................................................ 726/4
See application file for complete search history.

(56) References Cited

U.S. PATENT DOCUMENTS

| 7,263,688 | B2 | 8/2007 | Pitzel et al. |
| 7,680,932 | B2 | 3/2010 | Defaix et al. |
| 7,689,633 | B1 | 3/2010 | Li et al. |
| 7,707,413 | B2* | 4/2010 | Lunt et al. ................. 713/168 |
| 7,711,835 | B2 | 5/2010 | Braddy et al. |
| 7,734,914 | B1 | 6/2010 | Malasky |
| 7,779,113 | B1* | 8/2010 | Samar ......................... 709/224 |
| 7,827,201 | B1 | 11/2010 | Gordon et al. |
| 7,941,419 | B2 | 5/2011 | Bhatkar et al. |
| 7,996,380 | B2 | 8/2011 | Arrouye et al. |
| 8,108,427 | B2 | 1/2012 | Prahlad et al. |

(Continued)

FOREIGN PATENT DOCUMENTS

| KR | 10-2010-0137323 | 12/2010 |
| KR | 10-2012-0010397 | 2/2012 |

(Continued)

OTHER PUBLICATIONS

Taming Information-Stealing Smartphone Applications (on Android); Yajin Zhou, Xinwen Zhang, Xuxian Jiang, and Vincent W. Freeh; J.M. McCune et al. (Eds.): Trust 2011, LNCS 6740, pp. 93-107, 2011.*

(Continued)

*Primary Examiner* — James Turchen
(74) *Attorney, Agent, or Firm* — Ropes & Gray LLP

(57) ABSTRACT

Techniques are shown for providing third-party applications access to user resources based on user actions and processes that provide the third-party applications with the correct security tokens. The scope of access granted in various implementations of the disclosure is all documents which the user has already opened with the third-party application.

15 Claims, 5 Drawing Sheets

(56) References Cited

U.S. PATENT DOCUMENTS

| | | | |
|---|---|---|---|
| 8,131,723 B2 | 3/2012 | Sim-Tang | |
| 8,250,455 B2* | 8/2012 | Kadowaki et al. | 715/201 |
| 8,341,708 B1* | 12/2012 | Eatough et al. | 726/5 |
| 8,364,759 B2 | 1/2013 | Moromisato et al. | |
| 8,386,478 B2 | 2/2013 | Wang | |
| 8,478,817 B2 | 7/2013 | Duggal | |
| 8,522,137 B1* | 8/2013 | Brown et al. | 715/239 |
| 8,706,800 B1 | 4/2014 | Ahmed et al. | |
| 2003/0033369 A1 | 2/2003 | Bernhard | |
| 2003/0126592 A1 | 7/2003 | Mishra et al. | |
| 2004/0205358 A1 | 10/2004 | Erickson | |
| 2005/0243760 A1* | 11/2005 | Yoshioka | 370/328 |
| 2005/0289538 A1* | 12/2005 | Black-Ziegelbein et al. | 717/177 |
| 2006/0005168 A1 | 1/2006 | Singh | |
| 2006/0070029 A1 | 3/2006 | Laborczfalvi et al. | |
| 2006/0074837 A1 | 4/2006 | Braddy et al. | |
| 2007/0106984 A1 | 5/2007 | Birk Olsen et al. | |
| 2007/0254631 A1* | 11/2007 | Spooner | 455/411 |
| 2008/0162493 A1 | 7/2008 | Blohm et al. | |
| 2008/0172720 A1* | 7/2008 | Botz et al. | 726/3 |
| 2008/0184157 A1 | 7/2008 | Selig | |
| 2008/0189361 A1 | 8/2008 | Greschler et al. | |
| 2009/0083707 A1 | 3/2009 | Fujita et al. | |
| 2009/0210721 A1 | 8/2009 | Phillips | |
| 2009/0235352 A1* | 9/2009 | Schrijen et al. | 726/18 |
| 2009/0249185 A1 | 10/2009 | Datar et al. | |
| 2009/0254580 A1 | 10/2009 | Laurion | |
| 2009/0288135 A1* | 11/2009 | Chang et al. | 726/1 |
| 2010/0005529 A1* | 1/2010 | Hemade | 726/22 |
| 2010/0161762 A1 | 6/2010 | Saxena | |
| 2010/0257578 A1* | 10/2010 | Shukla et al. | 726/1 |
| 2010/0274910 A1* | 10/2010 | Ghanaie-Sichanie et al. | 709/229 |
| 2010/0281528 A1 | 11/2010 | Hayton et al. | |
| 2010/0325199 A1 | 12/2010 | Park et al. | |
| 2011/0066668 A1 | 3/2011 | Guarraci | |
| 2011/0137979 A1* | 6/2011 | Seo et al. | 709/203 |
| 2011/0154290 A1 | 6/2011 | Kelly | |
| 2011/0202672 A1 | 8/2011 | Narayanaswamy et al. | |
| 2011/0209045 A1 | 8/2011 | Ghosh et al. | |
| 2011/0231912 A1* | 9/2011 | Lee et al. | 726/7 |
| 2011/0247074 A1 | 10/2011 | Manring et al. | |
| 2011/0252038 A1 | 10/2011 | Schmidt et al. | |
| 2012/0005159 A1 | 1/2012 | Wang et al. | |
| 2012/0095878 A1 | 4/2012 | Feldman et al. | |
| 2012/0099135 A1* | 4/2012 | Ono | 358/1.13 |
| 2012/0110646 A1* | 5/2012 | Ajitomi et al. | 726/4 |
| 2012/0144202 A1* | 6/2012 | Counterman | 713/176 |
| 2012/0144454 A1* | 6/2012 | Lee | 726/4 |
| 2012/0158668 A1 | 6/2012 | Tu et al. | |
| 2012/0254042 A1* | 10/2012 | Ludemann | 705/78 |
| 2012/0266229 A1* | 10/2012 | Simone et al. | 726/9 |
| 2013/0018904 A1 | 1/2013 | Mankala et al. | |
| 2013/0036455 A1* | 2/2013 | Bodi et al. | 726/4 |
| 2013/0086670 A1* | 4/2013 | Vangpat et al. | 726/8 |
| 2013/0111336 A1 | 5/2013 | Dorman et al. | |
| 2013/0124606 A1 | 5/2013 | Carpenter et al. | |

FOREIGN PATENT DOCUMENTS

| | | |
|---|---|---|
| KR | 10-2012-0065072 | 6/2012 |
| KR | 10-2013-0007459 | 1/2013 |
| WO | WO-01/35211 A2 | 5/2001 |
| WO | WO-2010/054374 | 5/2010 |

OTHER PUBLICATIONS

The OAuth 2.0 Authorization Protocol; draft-ietf-oauth-v2-24; Mar. 8, 2012.*

MockDroid: trading privacy for application functionality on smartphones; Alastair R. Beresford, Andrew Rice, Nicholas Skehin, and Ripduman Sohan; HotMobile '11 Mar. 1-3, 2011, Phoenix, AZ, USA.*

Apex: Extending Android Permission Model and Enforcement with User-defined Runtime Constraints; Mohammad Nauman, Sohail Khan, Xinwen Zhang; ASIACCS'10 Apr. 13-16, 2010, Beijing, China.*

Building the PolarGrid Portal Using Web 2.0 and OpenSocial; Zhenhua Guo et al.; SC '09, Nov. 14-20, 2009 Portland, Oregon, USA; Copyright © 2009 ACM.*

Addressing cloud computing security issues; Dimitrios Zissis et al; Future Generation Computer Systems 28 (2012) 583-592.*

International Search Report for PCT/US2013/037701 dated Jun. 26, 2013.

http://web.archive.org/web/20110629120453/https://developer.mozilla.org/en/Setting_up_extension_development_environment, 2011, 5 pages.

http://web.archive.org/web/20111006093926/https://addons.mozilla.org/en-US/firefox/extensions/?sort=featured, 2011, 9 pages.

http://web.archive.org/web/20120512130530/https://developer.mozilla.org/en/Setting_up_extension_development_environment, 2012, 7 pages.

http://web.archive.org/web/20120819143535/https://addons.mozilla.org/en-US/firefox/extensions/?sort=featured, printed Dec. 13, 2013, 3 pages.

http://web.archive.org/web/20121020134710/https://addons.mozilla.org/en-US/seamonkey/extensions, printed Dec. 13, 2013, 3 pages.

http://web.archive.org/web/20121021135356/http://support.mozilla.org/en-US/kb/find-and-install-add-ons-add-features-to-firefox, printed Dec. 13, 2013, 3 pages.

http://web.archive.org/web20111226173518/http://en.wikipedia.org/wiki/Add-on_(Mozilla).

http://www-archive.mozilla.org/projects/webservices/, snapshot taken Apr. 21, 2008, printed Dec. 13, 2013, 4 pages.

https://addons.mozilla.org/en-US/firefox/addon/extension-manager-extended/, 2011, 2 pages.

https://addons.mozilla.org/En-us/seamonkey/addon/gmail-smime/?src=search, printed Dec. 13, 2013, 2 pages.

http://web.archive.org/web/20111219132014/https://addons.mozilla.org/en-US/seamonkey, 2011, 1 page.

International Search Report and Written Opinion dated Oct. 31, 2013 for Application No. PCT/US2013/047877—9 pages.

International Search Report and Written Opinion dated Jul. 28, 2014 in International Application No. PCT/US2014/029756—3 pages.

International Search Report and Written Opinion dated Oct. 31, 2013 for Application No. PCT/US2014/032167—3 pages.

* cited by examiner

CONTROLLING ACCESS BY WEB APPLICATIONS TO RESOURCES ON SERVERS

BACKGROUND

Security and privacy of online data and content are a concern for most users of the Internet and web-based storage systems. A user who would like to create new resources for, or who has stored certain personal or sensitive resources or content on a web-based storage system, would like to control access to these user resources.

SUMMARY

Techniques are disclosed for granting a third-party application access to a user resource located on a network system. A security model controls access to the resource and includes a user-based access control list (ACL) checking utility configured for determining whether a user is on a user-based ACL granting the user access to the one or more resources. An authorization token checking utility is also provided, and is configured for determining whether an access token has been granted by a token-grant server, authenticating the third-party application with the network system to access the one or more resources. A resource-based ACL checking utility is configured for determining whether a third-party application has permission to access a particular user resource on behalf of a particular user, based at least in part on metadata associated with the user resource. This metadata provides a record of whether the third-party application has been used by the particular user to access the one or more resources. An application audit list checking utility is configured for determining whether any user has employed the third-party application to access the one or more resources. An installation record checking utility determines whether the third-party application has been installed by the user. An authentication enablement utility is configured to enable an authentication of the third-party application and grant the third-party application permission to access the one or more resources upon receiving affirmative determinations in all of the group or a subset of the group of determinations made by the system.

Implementations may include corresponding systems, apparatus, and computer programs, configured to perform the actions of the methods, and encoded on computer storage devices. This Summary is not intended to introduce key features or essential features of the claimed subject matter, but merely provides a selection of concepts that are further described in the Detailed Description. Further implementations, features, and advantages, as well as the structure and operation of the various implementations are described in detail below with reference to accompanying drawings.

BRIEF DESCRIPTION OF THE FIGURES

Implementations are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Techniques are described for, among other things, managing access to specific user resources in a web-based, online, or network system (hereinafter referred to a "network system"). User resources may include files, data, and other content that a user has created or otherwise obtained, and wants to maintain access to, ownership of, and/or control over. Third-party applications may be granted access to the resources on the network system based on user actions and processes that provide the third-party applications with the correct security authentication. An application that has been granted access to a resource can be used to open, create, modify, or perform other functionalities on that resource.

Third-party applications may be one or more of software applications or programs developed or supplied by a party other than the owner or operator of the network system, or software applications or programs located on different servers, or having different access control than the network system irrespective of ownership. A user can discover a third-party application that they are interested in by using a web browser, an application store or marketplace, a search engine, a developer's website, shared content from another user, and advertisements in conventional media or on the internet. The user may then install the discovered application. The installation can be done by any of different means that include directly from an application store or marketplace, using a uniform resource locator (URL) provided by the third-party developer, by opening a shared document, or other methods. Security tokens are granted to user-authorized third-party applications, and include an identification of the user, and an identification of the application. Although not necessary, a description of the scope of authorization provided by the user for the resources to which access is granted can also be included. The security token is an authentication security device that may be used, for example, to authorize the use of computer services by a particular party with regard to any of the user's resources stored on the network system, and under certain constraints. The scope of access granted by an access token in various implementations of the disclosure is, for example, read and/or write access for selected documents, files, data, or other content, which the user previously accessed with the third-party application.

A third-party application is granted access to a particular user resource stored on web-based storage of the network system when several different checking utilities have made individual determinations that taken together result in authentication fulfillment and granting of access to the third-party application.

User-Based Access Control List Checking Utility

Figure 1:
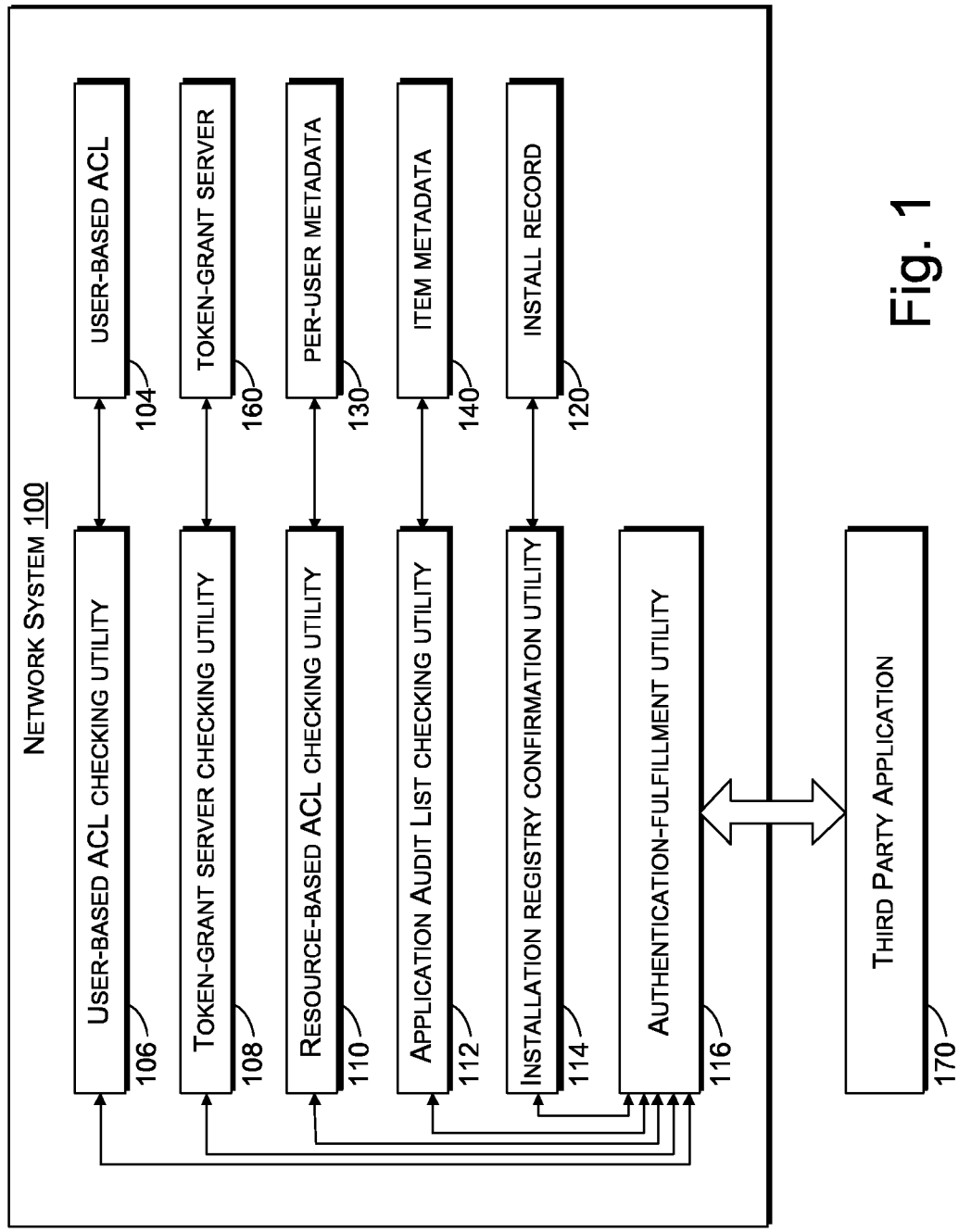
FIG. 1 is a schematic diagram of a system for granting third-party applications access to user resources on a web-based storage system in accordance with one or more implementations of the disclosure.

Referring initially to FIG. 1, in one example implementation, the network system 100 may create and store a user-based access control list (ACL) data record 104. This user-based ACL record 104 lists users or user groups that are granted access to a particular resource. A user-based ACL checking utility 106 is configured to determine whether a user should be granted access to a resource such as data, files, documents, or other content stored on web-based storage of the network system 100 based on user-based ACL 104. The user-based ACL can also specify what level of access is provided to the user, e.g., read, write, or other specified permissions. A resource that is confirmed to be accessible to a user based on the permissions specified by the user-based ACL 104 is referred to as a user resource. This determination is one of a group of determinations that may be completed before the network system 100 fulfills a third-party application access request and grants the third-party application 170 permission to access the user resource. One of ordinary skill in the art, after reading this entire description and the claims, will understand that the group of determinations made does not necessarily have to include all of the determinations shown in FIG. 1, and discussed herein.

Token-Grant Server Checking Utility

As shown in FIG. 1, token-grant server 160 may grant an access token to a third-party application 170 as a result of actions taken by a user. The third-party application developer can provide a uniform resource locator (URL) pointing back to the third-party application 170 that a user has installed. In one example, a user may select a document or resource on the network system, and a third-party application to open it with. In an alternative scenario, the user may select a third-party application to create a new document with. When the user makes this selection, the network system redirects the user to the URL for the third-party application. A user clicks on that URL when they want to use the third-party application to open, create, or modify a resource such as a file, data, a document, or other content on the target network system. In alternative implementations, communication between the third-party application and the network system can be facilitated through any suitable network protocol.

In at least one implementation, if the token-grant server has not previously granted an access token to a third-party application, a security page may be provided that pops up and asks the user if they want to grant the third-party application access to any of the user resources stored on the network system. If the user accepts, the token-grant server sends an authorization code to the third-party application. The third-party application then sends the token-grant server the authorization code, along with a client secret that is unique to the third-party and is used to verify the identity of the third-party. The token-grant server 160 then sends an access token back to the third-party application, which is used by the third-party application to gain access to the resource the user is attempting to open or otherwise operate on using the third-party application.

A token-grant server checking utility 108 may be configured to determine whether an access token has been sent by the token-grant server 160 to the third-party application 170, granting the third-party application access to the user resources. This determination is one of a group of determinations that may be made before the network system 100 fulfills a third-party application access request and grants the third-party application 170 permission to access a user resource.

Resource-Based ACL Checking Utility

The network system 100 creates a record to track which applications a particular user has used to open, create, modify, or otherwise work with a particular resource. This per-user metadata record 130 may preferably list all the applications used by each particular user to open a particular resource. As shown in FIG. 1, resource-based ACL checking utility 110 is configured to determine from this per-user metadata record 130 whether a user has used a particular third-party application 170 to access the user resource. The per-user metadata can be associated with the particular user resource such that retrieval of or access to the particular resource includes the summary information provided by the metadata, including that a particular user has previously used a particular third-party application to access that resource. This determination is one of a group of determinations that may be made before fulfilling a third-party application access request and granting the third-party application permission to access the user resource.

Application Audit List Checking Utility

The network system 100 may also create an application audit list record to track which applications have been used to open, create, or modify a particular resource, irrespective of any particular user. This item metadata record 140 lists all the applications used by any user to open a particular resource. Any application that has been added to the per-user metadata record 130 discussed above is also added to the item metadata record 140. There is only one item metadata record 140 per resource, and once added to this metadata record, an application is not removed. While a user can revoke a third-party application's access to the user's resources by uninstalling the application and removing the application from the per-user metadata record 130 discussed above, the application is not removed from the item metadata record 140. This ensures that the item metadata record 140 provides a record of which applications have ever accessed a resource. An application audit list checking utility 112 is configured to determine from this item metadata record 140 whether any user has used a particular third-party application 170 to access the user resource. This determination is not required as one of a group of determinations made before fulfilling a third-party application access request and granting the third-party application permission to access the user resource. This is because a third-party application that has been added to the per-user metadata record 130 has also automatically been added to the item metadata record 140.

Installation Registry Confirmation Utility

Installing an application is not to be confused with typical installation of software in which multiple files are copied to a user's hard drive or solid state drive and reside there until the software is uninstalled. Instead, the act of "installing" the third-party application constitutes registering a relationship between a user and the third-party application, and acts as a step toward allowing the third-party application to access user resources on network system 100.

When a user has decided to install a third-party application, the user can click on an install button at an installation notification provided by the third-party application or network system 100 in an application marketplace where the third-party application is available. Alternative implementations for installing a third-party application can include any user action signifying recognition on the part of the user that they are about to grant the third-party application access to one or more resources on network system 100. A decision by the user to accept the parameters detailed on the security page associated with a third-party application results in the user "installing" the application. The network system 100 records this installation on install record 120 shown in FIG. 1. The act of "installing" the third-party application constitutes registering a relationship between a user's account or web presence and the third-party application, and acts as a step toward allowing the third-party application to access the user's resources on the network system.

Figure 2:
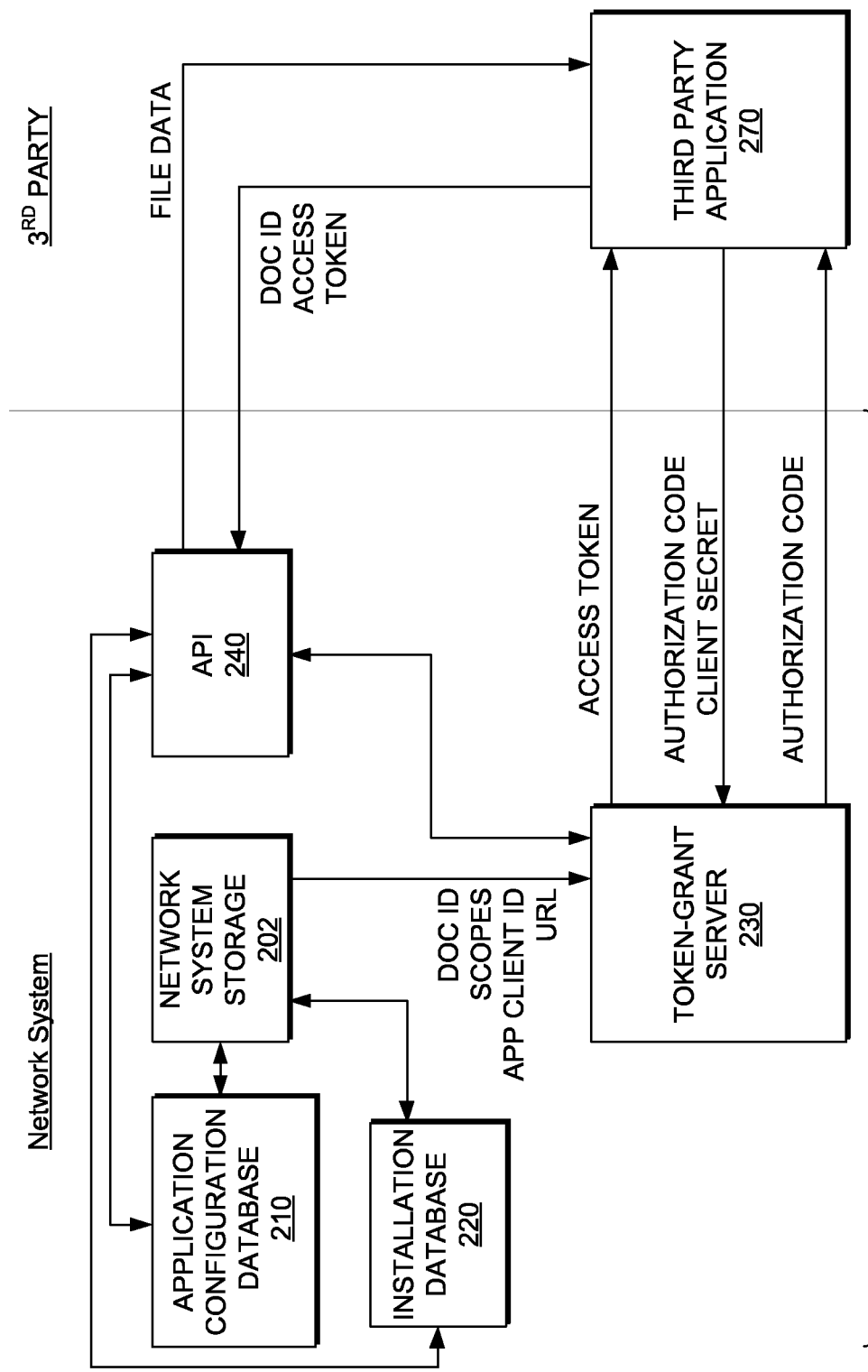
FIG. 2 is a schematic diagram showing features of the system employed in accordance with one or more implementations of the disclosure.

As shown in FIG. 2, when a user installs a third-party application, the network system 200 stores a record in an installation database 220. In various implementations, such an install record is also represented as the install record 120, shown in FIG. 1, and the install record 320, shown in FIG. 3. The install records 120, 220, 320 list the third-party applications installed by a user.

As shown in FIG. 1, an installation registry confirmation utility 114 is configured to determine from the install record 120 whether a third-party application 170 has been installed. This determination is one of a group of determinations that may be made before fulfilling a third-party application access request and granting the third-party application permission to access the user resource.

Authentication-Fulfillment Utility

The network system 100 may also include an authentication-fulfillment utility 116 configured to authenticate the third-party application 170 and grant the third-party application permission to access a user resource upon receiving affirmative determinations from a suitable combination of at least some of the user-based ACL checking utility 106, the token-grant server checking utility 108, the resource-based ACL checking utility 110, the application audit list ACL checking utility 112, and the installation registry confirmation utility 114.

Referring to FIG. 2, and as discussed above, a user can install a third-party application 270 written by a developer, and elect to allow that third-party application 270 to open files owned by the user and stored on the web-based storage 202 using "open with" or "default open with" functionality provided by the network system. The user can also use the third-party application 270 to create new files and other content on the network system 200, using "create with" functionality provided on the user's browser. The third-party application 270 can operate on data stored on the web-based storage 202 after being granted access, or create new data to be stored on the network system. As shown in FIG. 2, the third-party application 270 communicates over a network through an application programming interface (API) 240 for the online storage system 200. The user thereby gains the benefits of third-party applications that did not already exist on the network system, and can share those benefits with other users.

A user can discover a third-party application that they are interested in by using a web browser, an application store, a search engine, a developer's website, shared content from another user, and advertisements in conventional media or on the internet. The user may then install the discovered application. As discussed above, the act of "installing" the third-party application constitutes registering a relationship between a user's account and the third-party application, and acts as a step toward allowing the third-party application to access the user's resources on the network system that are associated with that user's account. When a user installs a third-party application, the network system 200 stores a record in an installation database 220.

The user then launches the third-party application 270 using functionality provided by the network system and accessed, e.g., by their browser, or through script provided with a browser extension, such as "create with", "open with", or "default open with". The third-party applications that the user has installed, and that are of a type appropriate for working with a particular resource, appear in a drop-down menu or list associated with the "create with", "open with", or "default open with" selections accessed by their browser, or browser extension. At any time the user decides that they no longer want an installed third-party application to have access to their user resources on the network system, the user can uninstall the third-party application. A third-party application that has been installed by a user and granted permissions in accordance with the security protocols described herein, can work on data that is stored on the network system, or on data that is kept on the third-party server.

Example Implementation

An example sequence of techniques performed in accordance with an implementation of this disclosure involves the application of a third-party photo-editing program for modifying a user's images stored on the network system. A user may discover a photo-editing program developed by a third-party from the third-party developer's website, as a result of a search of the internet, from a shared link to the program provided by another user, on an application store, or other means.

Referring to FIG. 2, the user then installs the third-party photo-editing program 270 by clicking on an install button at the installation page for the program discovered, e.g., on an application store or marketplace. When the user clicks on the install button, information regarding the third-party program is presented to the user, including the types of images the application can work on, who the developer is, other application configuration attributes, and any temporal or other limitations on the access the third-party application will be granted to the user's resources on the network system.

A security page appears the first time the user accesses the URL for a particular third-party application. The user is asked if they want to grant the third-party application access to certain of the user resources stored on the network system. If the user clicks on an accept button, and the token-grant server 230 has not already done so, the token-grant server 230, shown in FIG. 2, generates an access token to grant access to the user's resources. The access token granted by the token-grant server can provide different permission levels for different classes of resources. As several, non-limiting, examples, permission may be granted for the third-party application to open all images belonging to the user, to open and edit all images belonging to the user, to open and edit all files owned by the user, to read only files owned by the user, etc. The token-grant server 230 retrieves an application ID from an application configuration database 210. Application configuration database 210 can store configuration attributes for third-party applications that allows the third-party application to communicate with the web-based storage system. An authorization code is passed to the third-party application 270. The third-party application 270 will need this authorization code along with a client secret (verifying that the third-party application is the correct application) to pass back to the token-grant server 230 in exchange for an access token. The token-grant server knows from receipt of the authorization code and client secret that the access token is being sent to the correct third-party application. The third-party application can then send the access token along with a document ID to the application programming interface (API) 240 for the web-based system 200 to gain access to the file data for the user resource.

In the example of editing a user photo stored on the web-based system, if a user has installed one or more photo-editing programs, the user could left click or right click on an image that they wish to edit, and then select the desired third-party photo-editing program they have installed from the drop-down list that would be associated with the "open with" functionality presented by the user interface (UI). Another possible alternative could include left clicking or right clicking on the image to result in "default open with" functionality where the user has previously selected a particular photo-editing program to be their default program for editing images. The user could then use the photo-editing program they selected to edit the image, and save the edited image back to their document list on the web-based storage system, share the edited image with friends or family, or other functionality. Yet another alternative could include "create with" functionality available to the user on their browser or browser extension, which could present a number of programs previously installed by the user and available to facilitate the creation of an image or other object for storage on the web-based storage system.

Figure 3:
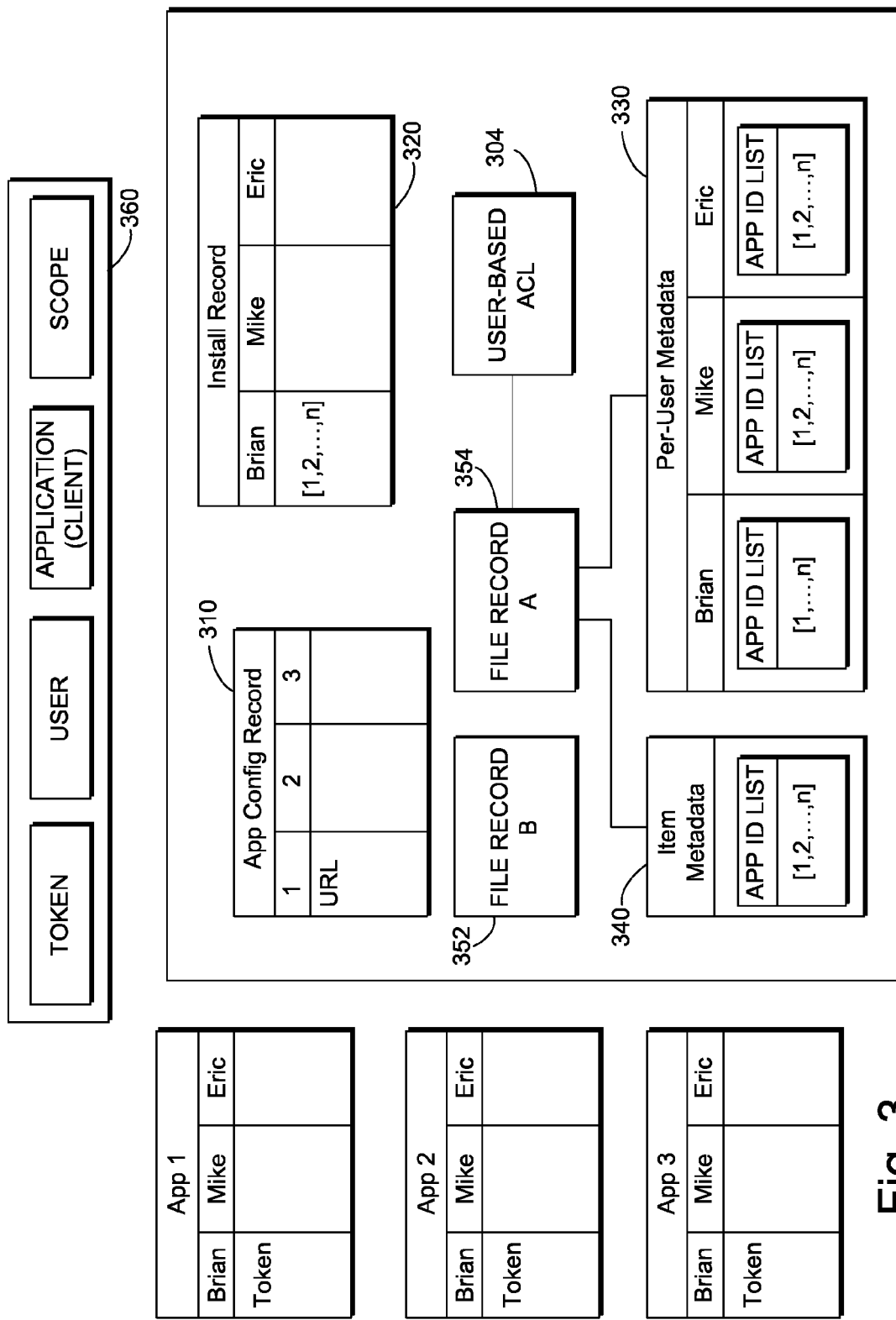
FIG. 3 is a schematic diagram of a security model employed in accordance with one or more implementations of the disclosure.

Referring to FIG. 3, a diagram of a security model in accordance with one implementation is illustrated. The security model controls access to a user's files and data on the web-based storage system. The security model only allows a third-party application to access documents that the user previously opened with that application, and/or where the user has explicitly authorized access by that third-party application. This security model of FIG. 3 is described in greater detail below with reference to FIG. 4.

Figure 4:
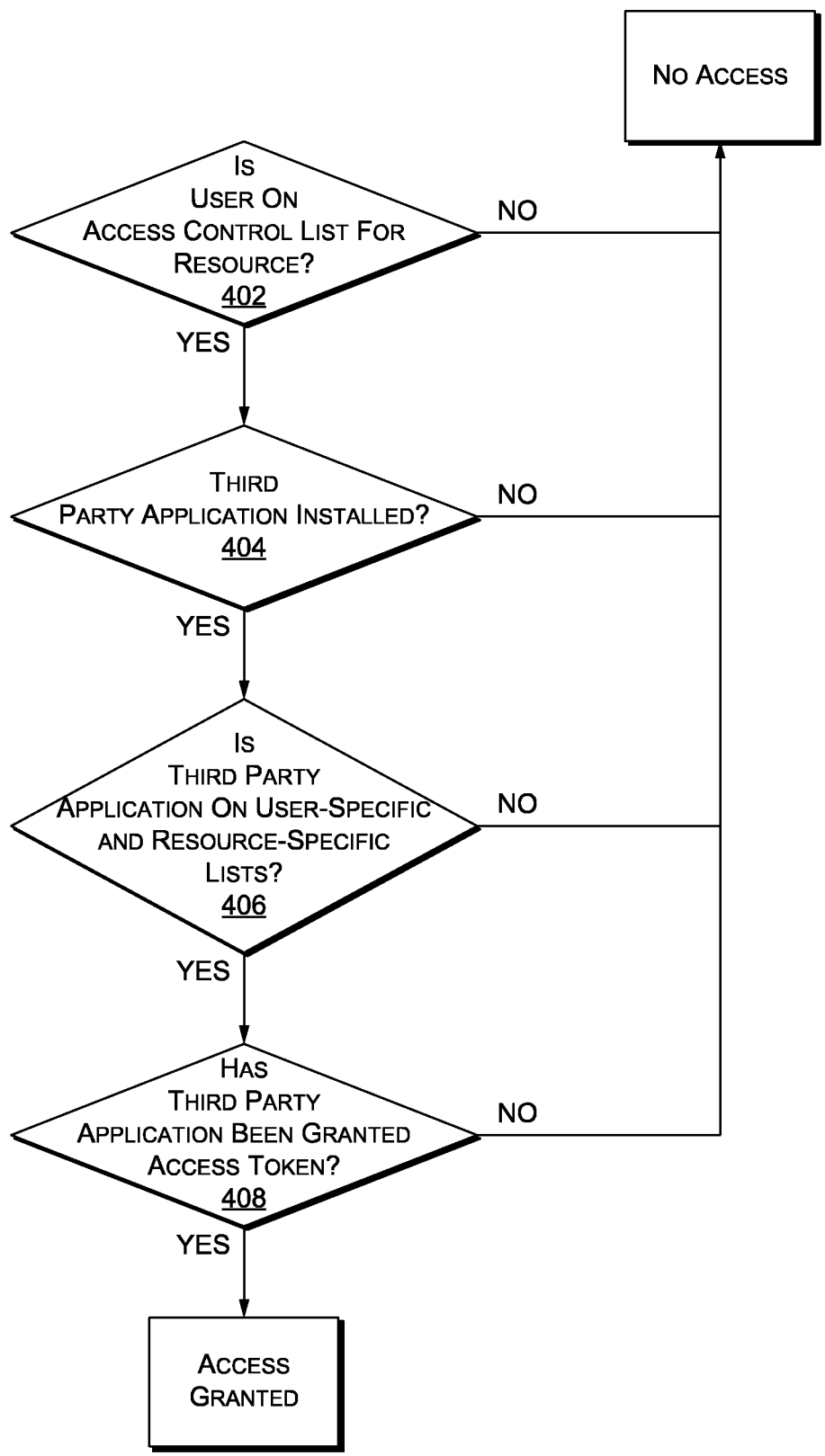
FIG. 4 is a flow chart of techniques employed in accordance with one or more implementations of the disclosure.

Referring to FIG. 4, the determinations that are made by the above-discussed utilities are shown. One of ordinary skill in the art will recognize that the determinations illustrated in FIG. 4 could be made in any order, and the example order of determinations shown in FIG. 4 is just one implementation, and is not in any way limiting. At 402, the security model employs a user-based ACL checking utility (106 in FIG. 1) to determine whether the user is on a user-based ACL (104 in FIG. 1) for the particular resource now being accessed.

As discussed above, when the user opens a document from a document list on the web-based storage system using a third-party application, the user must first install the application. At 404 in FIG. 4, the installation registry confirmation utility 114 of FIG. 1 checks the install record 120 to determine whether the third-party application has been installed.

Referring back to FIG. 2, the application ID for the third-party application used to open the document is retrieved from an application configuration database 210 maintained on the storage 202 of web-based storage system 200. The application ID is written into a piece of metadata that is kept on the document itself. This per-user metadata is recorded in per-user metadata record 130, shown in FIG. 1, and is specific for a document and for the particular user who used that application to open that document.

As shown in FIG. 2, an installation database 220 and application configuration database 210 are part of, or communicatively coupled with, the web-based storage system 200. A token-grant server 230 is also provided in communication with the web-based storage system 200 and with the third-party application 270 selected by a user to open a user resource on the web-based storage system 200. Third-party application 270 makes an API call through API 240 of the web-based system with the required security credentials, such as the document ID of a resource and an access token, to gain access to the resource on the web-based storage system 200.

Referring to FIG. 3, a diagram illustrates the various records that are checked before granting a third-party application access to user resources on the web-based storage system. Referring to FIG. 4, at 402 a user-based ACL checking utility determines whether a user is on a user-based ACL, which confirms that the user has access to the particular resource. As shown at 404 of FIG. 4, an installation registry confirmation utility checks an installation record on the web-based storage system to determine whether a particular user has installed the third-party application. In FIG. 3, the user Brian has installed at least application #1. When the user Brian installed application #1, the configuration attributes of application #1 were entered into an application configuration record 310. These attributes could include the URL of the third-party application's web site, the application ID, the multipurpose internet mailbox extension (MIME) types of files the third-party application can work on, etc.

A per-user metadata record 330 registers the applications that have been used by each user (Brian, Mike, and Eric in FIG. 3) to open a particular file record A (resource 354) stored on the web-based system. As discussed above, the resource-based ACL checking utility 110 checks this per-user metadata record 330 (shown as 130 in FIG. 1) to determine whether a particular user has used a particular application to open a particular file record. A separate item metadata record 340 is also written to the web-based storage system, with the item metadata record 340 registering all third-party applications that have been used by any user to open the particular file record A (resource 354). As shown in FIG. 1, an application-based ACL checking utility 112 checks this item metadata record 340 (shown as 140 in FIG. 1) to determine whether any user has used a particular application to open a particular file record.

At 406 of FIG. 4, the resource-based ACL checking utility (110 in FIG. 1) and the application-based ACL checking utility (112 in FIG. 1) determine whether a third-party application is on a user-specific list (per-user metadata record 330 in FIG. 3, and 130 in FIG. 1) and on a resource-specific list (item metadata record 340 in FIG. 3, and 140 in FIG. 1) lists. As further shown at 408 of FIG. 4, a token-grant server checking utility (108 in FIG. 1) determines whether an authorization access token 360 has been granted. The authorization access token is granted per user, per third-party application, and per scope—specifying which resource a particular user has granted access to for a particular third-party application, along with any other limitations on the access, such as temporal restrictions, etc. The scope granted per authorization access token in accordance with an implementation of this disclosure is to allow a third-party application access to a resource that the third-party application has previously been used to open.

The security model in accordance with various implementations of this disclosure therefore provides four layers of protection. One layer of protection requires that a user-based access control list (ACL) 304, shown in FIG. 3, is checked to confirm that the user has access to the resource. Another layer of protection requires that an application installation record 320 is checked to see whether the user has installed the third-party application. Yet another layer of protection requires that the user must have authorized a token-grant server to provide an authorization access token, e.g., using OAuth 2.0 protocol, to the third-party application. The authorization access token 360 includes the user ID (from cookies on the user's device), the third-party application ID (retrieved from the application configuration database maintained on the web-based storage system), and the resource scope that is being granted. Still another layer of protection requires that application-specific lists are checked. The third-party application must be on a user-specific list (per-user metadata 330), indicating that a particular user has used that application to access a particular resource or file, and on an item-specific list (item metadata 340), indicating that the application has been used by any user to access that particular resource or file.

In one example implementation, the user-specific list (per-user metadata 330) can be limited in number such that, e.g., no more than 20 third-party applications are being used at one time by a particular user to open a particular resource. In this implementation, when the user opens the particular resource with a $21^{st}$ third-party application, the $1^{st}$ third-party application used by that user to open the resource would drop off the user-specific list, and would no longer be allowed to access that particular resource. The number 20 is just one non-limiting example of a number of third-party applications that could be allowed to open a particular resource simultaneously for one particular user.

A security model that grants a third-party application general access to a user's document list or web-based storage drive would allow the third-party application to read from and write to any user files on the list or drive. A security model in accordance with one or more implementations of the present disclosure, grants access to user resources for the third-party application at a file level, or individual resource level, rather than at a file folder level, or drive level. To avoid inconveniencing users by requiring that a third-party application request access to the user resources on a per-file basis, when a user opens a file, the third-party application used to open that file is granted access to that particular file from that point on until the access is revoked.

When a user wants to grant an authorization token to a third-party application, the user is granting that third-party application access to user resources that the third-party application will process on behalf of the user. The third-party generates a URL that points to an API for a server of the target web-based storage system. The user who has discovered the third-party application clicks on the URL and is taken to a security page that asks the user if they want to grant the third-party application access to particular user resources. If the user clicks accept, the web-based system generates a token, which is then passed to the third-party, and that token is the thing that the third-party application needs to provide back to the web-based storage system to authorize their requests. As explained above, the token includes information on the particular user, the particular third-party application, and the particular resource that the user authorized the third-party application to access.

The approaches and systems described herein may be deployed in part or in whole through a machine that executes computer software, program codes, and/or instructions on one or more processors contained in the client devices and/or the server or servers associated with the web-based storage system.

Implementations of the disclosure may include a method on a machine, a system or apparatus as part of or in relation to the machine, or a computer program product embodied in a computer readable medium executing on one or more of the machines. The one or more processors may be part of a server, client, network infrastructure, mobile computing platform, stationary computing platform, or other computing platform.

A processor may be any kind of computational or processing device capable of executing program instructions, codes, binary instructions and the like. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

Figure 5:
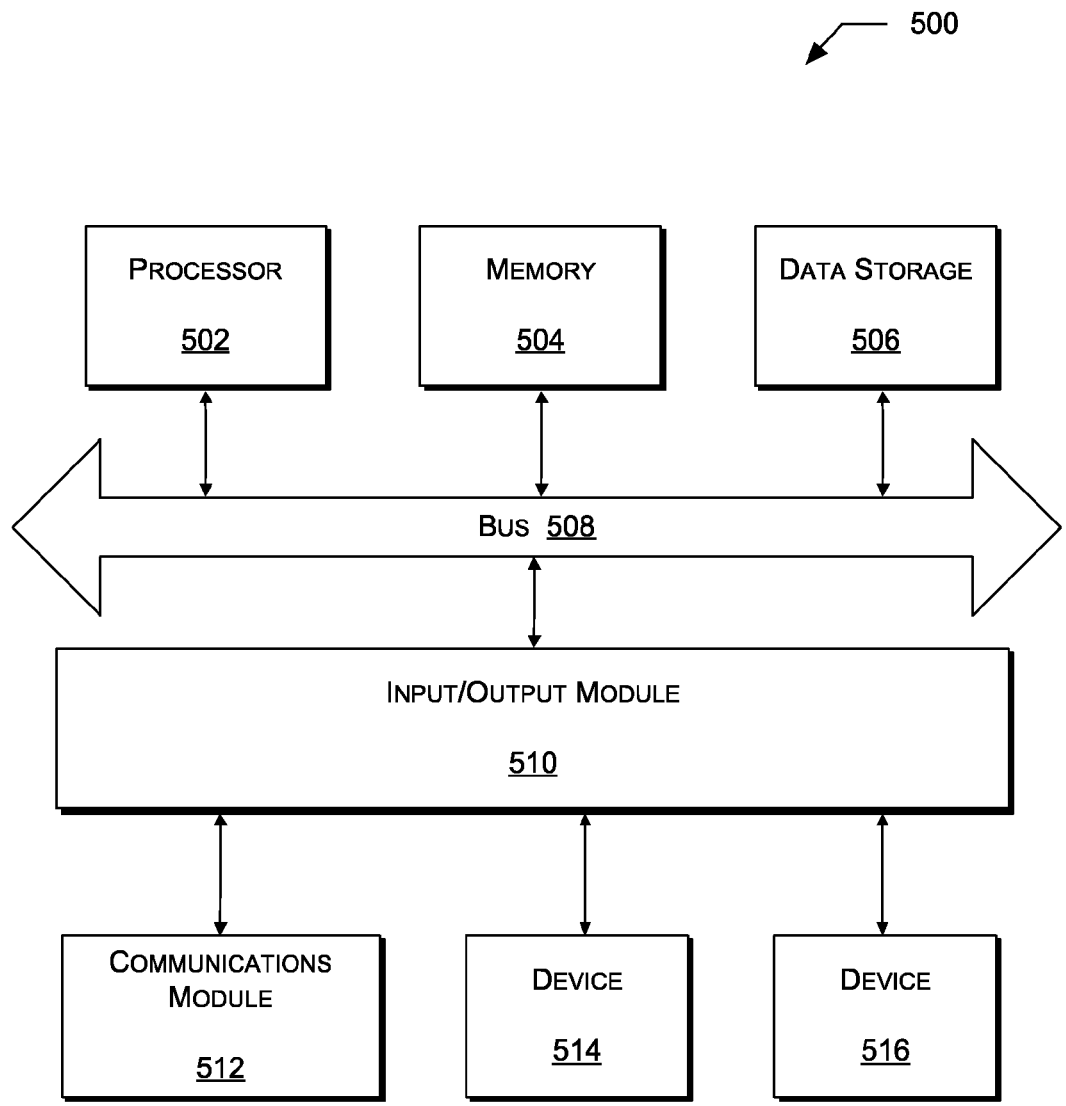
FIG. 5 is a schematic diagram of an exemplary computer system employed in accordance with one or more implementations of the disclosure.

FIG. 5 is a block diagram illustrating an exemplary computer system 500 with which the security model of FIGS. 1 and 2 can be implemented. In certain aspects, the computer system 500 may be implemented using hardware or a combination of software and hardware, either in a dedicated server, or integrated into another entity, or distributed across multiple entities.

Computer system 500 includes a bus 508 or other communication mechanism for communicating information, and a processor 502 coupled with bus 508 for processing information. By way of example, the computer system 500 may be implemented with one or more processors 502.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, logic circuitry.

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more location without deviating from the scope of the disclosed subject matter. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various techniques identified and described above may be varied, and that the order of techniques may be adapted to particular applications of the techniques disclosed herein. All such variations and modifications are intended to fall within the scope of this disclosure. As such, the depiction and/or description of an order for various techniques should not be understood to require a particular order of execution for those techniques, unless required by a particular application, or explicitly stated or otherwise clear from the context.

The methods and/or processes described above, and techniques thereof, may be realized in hardware, or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The instructions may be stored in the memory 404 and implemented in one or more computer program products, i.e., one or more modules of computer program instructions encoded on a computer readable medium for execution by, or to control the operation of, the computer system 400, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python).

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 include networking interface cards, such as Ethernet cards and modems. In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the web-based system 100, as shown in FIG. 1, can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process s described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a personal area network (PAN), a local area network (LAN), a campus area network (CAN), a metropolitan area network (MAN), a wide area network (WAN), a broadband network (BBN), the Internet, and the like. Further, the communication networks can include, but are not limited to, for example, any one or more of the following network topologies, including a bus network, a star network, a ring network, a mesh network, a star-bus network, tree or hierarchical network, or the like. The communications modules can be, for example, modems or Ethernet cards.

As discussed above, computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, an enterprise server or group of servers, one or more desktop computers, one or more laptop computers, etc. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments or implementations can also be implemented in combination in a single embodiment or implementation. Conversely, various features that are described in the context of a single embodiment or implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

In the claims appended herein, the inventor invokes 35 U.S.C. §112, paragraph 6 only when the words "means for" or "steps for" are used in the claim. If such words are not used in a claim, then the inventor does not intend for the claim to be construed to cover the corresponding structure, material, or acts described herein (and equivalents thereof) in accordance with 35 U.S.C. §112, paragraph 6.

What is claimed is:

1. A system that facilitates granting a third-party application access to a user resource located on a network system, the system comprising:
    a user-based access control list (ACL) checking utility implemented on a hardware processor configured to determine whether a first user has permission to access the user resource;
    a token-grant server checking utility implemented on the hardware processor configured to determine whether a token grant server has authenticated the third-party application with the network system by determining whether the token-grant server has sent an authorization code to a third-party application along with a document ID when the first user installs the third-party application for use with a resource identified by the document ID, whether the token-grant server has received the authorization code back from the third-party application along with a client secret that identifies the third-party application as the intended recipient of the authorization code, and whether the token-grant server has sent an authorization access token to the third-party application after receiving the authorization code and client secret from the third-party application;
    a resource-based ACL checking utility implemented on the hardware processor configured to determine whether the third-party application has permission to access the user resource on behalf of the first user, based on metadata associated with the user resource, and information indicating whether a second user has used the third-party application to access the user resource, wherein the first user is not the second user; and an authentication-fulfillment utility implemented on the hardware processor configured to fulfill the third-party application access request upon receiving affirmative determinations in all of the determinations made by the system, the fulfillment including enabling an authentication of the third-party application and granting the third-party application permission to access the user resource.

2. The system according to claim 1, further including:
an installation registry confirmation utility configured to determine whether the third-party application has been installed by the first user.

3. The system according to claim 1, further including:
an application programming interface (API) configured to receive an application ID from the third-party application and the authorization access token granted to the third-party application by the token-grant server.

4. The system according to claim 1, wherein:
the resource-based ACL checking utility is further configured to write metadata to the user resource, the metadata containing an identification (ID) for the third-party application used by the first user to access the user resource and a user ID.

5. The system according to claim 4, wherein:
the resource-based ACL checking utility is further configured to write to a file record data specifying that the third-party application has been used to access the user resource.

6. The system according to claim 4, wherein:
the resource-based ACL checking utility is further configured to limit how many different third-party applications that the first user can use simultaneously to access a particular user resource.

7. The system according to claim 6, wherein:
the resource-based ACL checking utility is configured to remove the first of a series of third-party applications that the first user is using to simultaneously access the particular user resource when the series reaches a limit and the first user attempts to access the particular user resource using an additional third-party application.

8. A computer implemented method that facilitates granting a third-party application access to one or more user resources located on a web-based storage system, the method comprising:
determining, using a processor, whether a first user is on a user-based access control list (ACL) granting the first user access to the one or more user resources;
determining, using the processor, whether an authorization access token has been granted by a token-grant server granting the third-party application limited access to the one or more resources by determining whether the token-grant server has sent an authorization code to a third-party application when the first user installs the third-party application, whether the token-grant server has received the authorization code from the third-party application along with a client secret that identifies the third-party application as the intended recipient of the authorization code, and whether the token-grant server has sent an authorization access token to the third-party application after receiving the authorization code and client secret at the token-grant server from the third-party application;
determining, using the processor, whether the third-party application is on a resource-specific ACL, indicating that a second user has used the third-party application to access the one or more resources, wherein the first user is not the second user;
determining, using the processor, whether the third-party application has been installed by the first user; and
in response to an affirmative determination for each of the determinings, fulfilling, using the processor, the third-party application access request, the fulfilling including enabling an authentication of the third-party application and granting the third-party application permission to access the one or more user resources.

9. The method according to claim 8, further including:
calling, using the processor, an application programming interface (API) configured to receive an application ID from the third-party application and the authorization access token granted to the third-party application by the token-grant server.

10. The method according to claim 8, further including:
writing, using the processor, metadata to the one or more user resources, the metadata containing an ID for the third-party application used by the first user to access the one or more user resources and a first user ID corresponding to the first user.

11. The method according to claim 10, further including:
writing, using the processor, data to a file record on the web-based storage system specifying that the third-party application has been used to access the one or more user resources.

12. The method according to claim 10, further including:
limiting, using the processor, how many different third-party applications that the first user can use simultaneously to access a particular user resource to a known number.

13. The method according to claim 12, further including:
ending, using the processor, access to the resource for the first of a series of third-party applications that the first user is using to simultaneously access the particular user resource when the series reaches a limit equal to the known number and the first user attempts to access the particular user resource using an additional third-party application.

14. A tangible, machine-readable, non-transitory storage medium having stored thereon program instructions that facilitate granting a third-party application access to one or more user resources located on a web-based storage system, the instructions when executed by a machine cause the machine to perform operations comprising:
determining whether a first user is on a user-based access control list (ACL) granting the first user access to the one or more user resources;
determining whether an authorization access token has been granted by a token-grant server granting the third-party application limited access to the one or more resources by determining whether an authorization code has been sent from the token-grant server to a third-party application when the first user installs the third-party application, whether the authorization code has been received at the token-grant server from the third-party application along with a client secret that identifies the third-party application as the intended recipient of the authorization code, and whether an authorization access token has been sent to the third-party application after receiving the authorization code and client secret from the third-party application;
determining whether the third-party application is on a resource-specific ACL, indicating that a second user has used the third-party application to access the one or more resources, wherein the first user is not the second user;

determining whether the third-party application has been installed by the first user; and in response to an affirmative determination for each of the determinings, fulfilling the third-party application access request, the fulfilling including enabling an authentication of the third-party application and granting the third-party application permission to access the one or more user resources.

15. The non-transitory storage medium according to claim 14, the operations further comprising:

writing metadata to the one or more user resources, the metadata containing an ID for the third-party application used by the first user to access the one or more user resources and a first user ID corresponding to the first user.

* * * * *